(No Model.)

M. K. LEWIS.
SPROCKET WHEEL.

No. 251,610. Patented Dec. 27, 1881.

Attest.
A. L. Hork.
C. C. Rittenhouse

Inventor.
Miles K. Lewis
Anderson & Smith
att'ys

UNITED STATES PATENT OFFICE.

MILES K. LEWIS, OF HASTINGS, NEBRASKA.

SPROCKET-WHEEL.

SPECIFICATION forming part of Letters Patent No. 251,610, dated December 27, 1881.

Application filed July 9, 1881. (No model.)

*To all whom it may concern:*

Be it known that I, MILES K. LEWIS, of Hastings, in the county of Adams and State of Nebraska, have invented certain new and useful Improvements in Sprocket-Wheels; and I do hereby declare that the following is a full, clear, and exact description of the same, reference being had to the accompanying drawings, in which—

Figure 1:
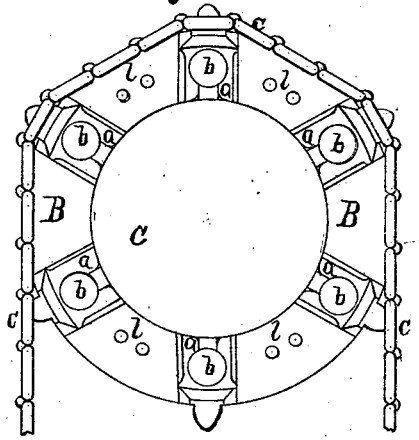
Figure 5:
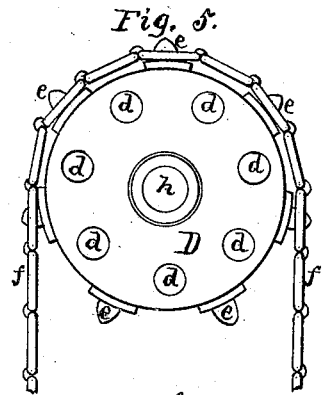
Figure 2:
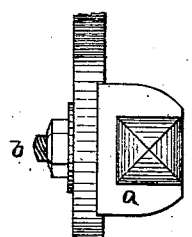
Figure 3:
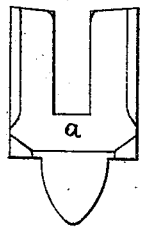
Figure 4:
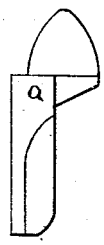
Figure 6:
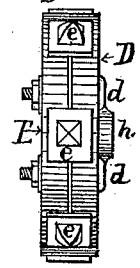
Figure 7:
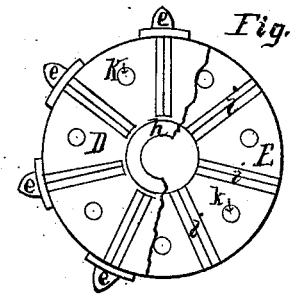
Figure 8:
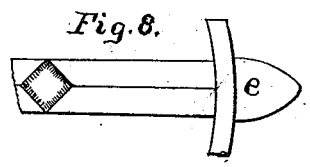

Figure 1 is a side elevation. Fig. 2 is a sectional detail. Fig. 3 is a side view of the adjustable sprocket. Fig. 4 is an edge view of the same; and Figs. 5, 6, 7, and 8 are modifications of the device.

This invention has relation to sprocket-wheels; and it consists in the novel construction and arrangement of parts, as will be hereinafter fully described, and particularly pointed out in the claims.

Heretofore the wheel and sprockets have been cast in one piece. The objection to this form is that the endless chain passing over two such wheels rides upon the sprockets when the chain becomes lengthened by use, which use causes it to wear away, and thereby causes greater friction and unnecessary strain upon the chain.

To obviate these defects I provide the wheel with an adjustable sprocket, $a$, bifurcated, as shown, to slide over a bolt, $b$, projecting from the face of the disk or wheel $c$, and secure it in place by a binding-nut, $d$, so that it may be extended to compensate for the wear of the endless chain.

Grooves may be made in the disk or wheel, and the sprockets may have shanks to fit these grooves, and set-screws may be employed to lock them in place, and other modifications may be employed, the main idea being to produce an adjustable sprocket.

Having thus fully described my invention, what I claim as new, and desire to secure by Letters Patent, is—

1. In a sprocket-wheel, a series of adjustable sprockets constructed and arranged to be moved to and from the center of the wheel to which they are secured to increase or diminish the distance between their projecting points, substantially as specified.

2. A disk or wheel combined with a series of adjustable sprockets, substantially as specified.

MILES K. LEWIS.

Witnesses:
WILLIAM B. EVERETT,
EDGAR L. LEWIS.